July 23, 1957     J. DE SWART     2,800,423
MOLDED ARTICLE OF STRETCHABLE GLASS CLOTH
Filed Oct. 18, 1954
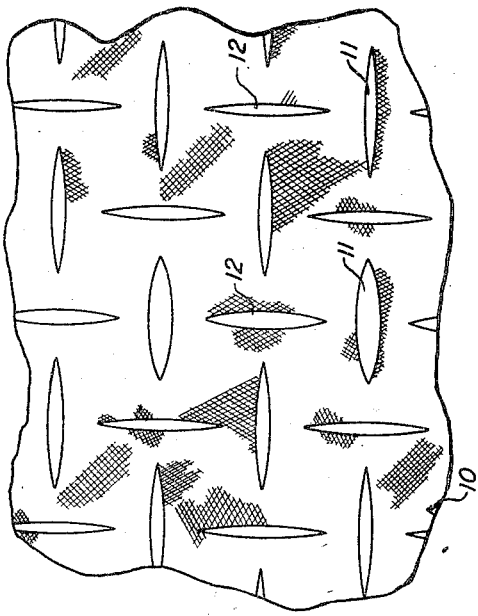
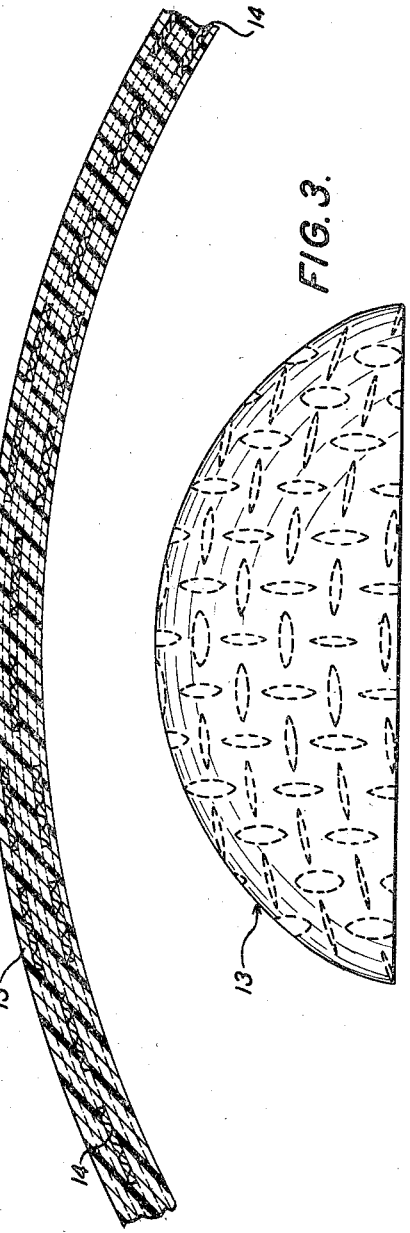
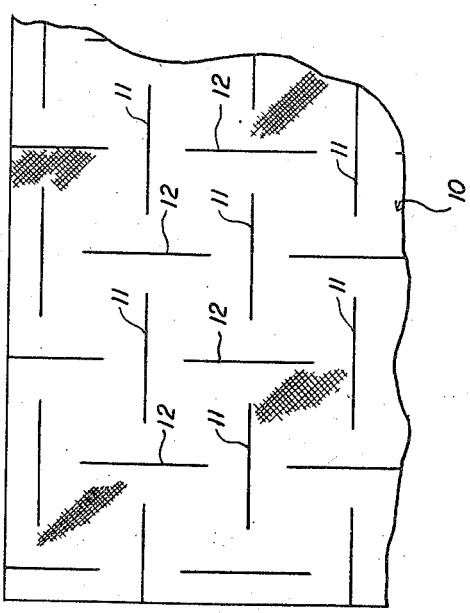
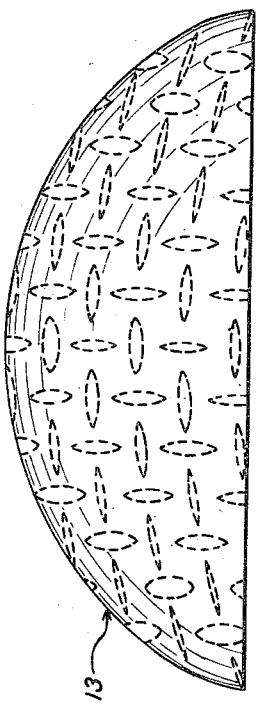
INVENTOR.
JAN DE SWART
BY
Christie, Parker & Hale
ATTORNEYS

United States Patent Office 2,800,423
Patented July 23, 1957

2,800,423

MOLDED ARTICLE OF STRETCHABLE GLASS CLOTH

Jan de Swart, Los Angeles, Calif., assignor to De Swart Development Company, Los Angeles, Calif., a limited partnership Application October 18, 1954, Serial No. 462,990

3 Claims. (Cl. 154—43)

This invention relates to fabrics and plastic articles reinforced with fabrics, and is primarily concerned with stretchable fabrics containing a material or materials which are not ordinarily considered elastic or stretchable.

The most common example to which the invention is applicable is a glass cloth which uses glass fibers to make up a tough fabric. However, the invention may also employ other fibers or filaments, for example, metal or wire filaments, in place of glass fibers.

At present there is considerable effort on the part of industry in general to replace metal parts with plastic parts wherever possible in order to achieve reduced cost and reduced weight. For example, extensive work has been done in the automobile industry to build automobile bodies and fenders out of thermosetting plastics. Most plastics now economically practical do not possess sufficient strength when used by themselves, and current practice is to reinforce such plastics by molding them around glass cloth or forming a laminated structure of glass cloth and thermosetting plastic. The glass fibers of the glass cloth reinforce the brittle thermosetting plastic in a manner analogous to that in which steel rods reinforce concrete, and give a tough, durable product.

Glass cloth presently used is not stretchable and as a consequence, to form compound curved surfaces (e. g., spherical or warped surfaces) it is necessary to cut the cloth from patterns into accurately shaped pieces and tailor fit the individual pieces into a mold. This is time-consuming and greatly increases the cost of plastic structures made by this method.

This invention provides a fabric containing glass fiber or other suitable reinforcing fiber which is readily stretchable in all directions in the plane of the fabric and is well adapted for fitting compound curvatures without any need for cutting special patterns.

Briefly, the invention contemplates a fabric made of non-elastic fibers and provided with a plurality of spaced slits so that the fabric is stretchable in any direction in the plane of the fabric.

Preferably, the fabric of the invention is made of non-stretchable fibers, such as glass fibers, and the spaced slits are divided into two groups which are equally distributed in mutually perpendicular orientation. The slits are symmetrically arranged so that a projection of the axis of each slit bisects the adjacent perpendicular slits. With this arrangement the fabric has a uniform strength and elasticity.

In terms of a structural article of manufacture, the invention comprises a plastic sheet having a compound curvature and reinforced with a plurality of layers of fabric made in accordance with the invention.

These and other aspects of the invention will be more clearly understood from the following detailed description taken in conjunction with the accompanying drawing in which:

Fig. 1 is a plan view of a piece of fabric provided with slits, the fabric being in an unstretched condition;

Fig. 2 is a plan view of the fabric of Fig. 1 under tension stretching it in all directions in the plane of the cloth;

Fig. 3 is an elevation of a plastic sheet molded in the form of a hemisphere and reinforced by the fabric of the invention; and Fig. 4 is a vertical section of the plastic sheet of Fig. 3 showing in detail how layers of fabric are arranged to reinforce the plastic.

Referring to Fig. 1, a conventional sheet of glass cloth fabric 10 is provided with two groups of slits, a plurality of transverse slits 11 and a plurality of longitudinal slits 12. The slits of each group are mutually perpendicular and are arranged in a symmetrical alternating pattern so that a projection of the axis of each slit bisects the adjacent perpendicular slits. Thus, the glass cloth fabric which ordinarily is not stretchable in any direction may be stretched in any direction in the plane of the cloth. Fig. 2 illustrates how the slits in the fabric open up to allow the cloth to be stretched under tension.

Figs. 3 and 4 illustrate a typical plastic product in which the fabric of the invention can be used to reinforce a plastic sheet having a compound curvature. A plastic sheet 13 molded in the form of a hemisphere is reinforced by three layers 14 of the fabric embedded in the plastic. The layers of fabric are staggered so that the slits of the adjacent layers are out of register, thus providing greater strength to the plastic sheet.

A plastic sheet such as that illustrated in Figs. 3 and 4 is made for forcing the plastic, e. g., a phenolic resin, into the fabric and in between the layers of fabric in a mold under pressure sufficient to deform the fabric to fit the mold. The plastic is allowed to set while it and the fabric are held in the required position.

By using a stretchable fabric provided with slits as illustrated in Fig. 1, it is possible to obtain a finished product of uniform strength and high quality finish. The reason for this is that each portion of the fabric is capable of uniform expansion and contains the same amount of reinforcing material, e. g., glass fibers. This quality is particularly important where precision parts are to be produced, for example, parts to be used in aircraft construction and the like.

Ordinarily thermosetting plastics and glass fiber cloth or fabric are used, but the invention is not limited to the particular type of plastic, nor is it limited to any particular type of fabric.

I claim:

1. A plastic sheet having a compound curvature and reinforced with a plurality of cloth fabric layers woven from non-elastic fibers, each layer of fabric being provided with a plurality of slits which penetrate the fabric, a portion of the slits in each layer being transverse to the other slits.

2. A plastic sheet having a compound curvature and reinforced with a plurality of cloth fabric layers woven from glass fiber, each layer of fabric being provided with a plurality of slits which penetrate the fabric, a portion of the slits in each layer being transverse to the other slits.

3. A plastic sheet having a compound curvature and reinforced with a plurality of cloth fabric layers woven from non-elastic fibers, each layer of fabric being provided with a plurality of slits which penetrate the fabric, a portion of the slits in each layer being transverse to the other slits and each layer of fabric arranged so that the slits of adjacent layers are out of register.

References Cited in the file of this patent

UNITED STATES PATENTS

| | | |
|---|---|---|
| 1,433,077 | Hansen | Oct. 24, 1922 |
| 2,046,988 | Winter | July 7, 1936 |
| 2,202,014 | Lougheed | May 28, 1940 |
| 2,423,076 | Daly | July 1, 1947 |
| 2,489,541 | Read | Nov. 29, 1949 |
| 2,556,071 | Denton | June 5, 1951 |
| 2,653,889 | Hager et al. | Sept. 29, 1953 |